Feb. 17, 1970

J. I. HANSSON ET AL 3,495,505

FORMING RING FOR GUIDING AND SHAPING
A WEB-LIKE MATERIAL INTO A TUBE

Filed Aug. 4, 1966

INVENTORS
JAN I. HANSSON
HARALD G. SWEDE

BY *Earl P. Morden*

ATTORNEY

Feb. 17, 1970  J. I. HANSSON ET AL  3,495,505
FORMING RING FOR GUIDING AND SHAPING
A WEB-LIKE MATERIAL INTO A TUBE
Filed Aug. 4, 1966  3 Sheets-Sheet 3
Fig. 3
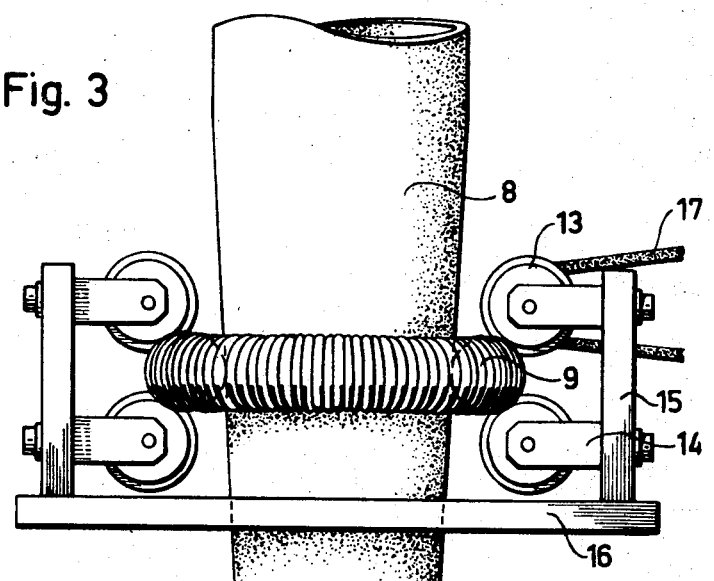
Fig. 4  Fig. 5
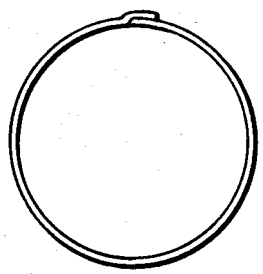 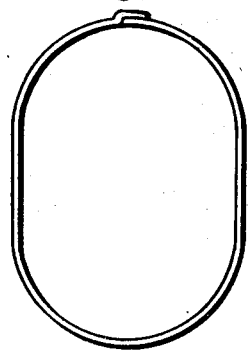
INVENTORS
JAN I. HANSSON
HARALD G. SWEDE

United States Patent Office 3,495,505
Patented Feb. 17, 1970

3,495,505
FORMING RING FOR GUIDING AND SHAPING A WEB-LIKE MATERIAL INTO A TUBE
Jan Ingvar Hansson, Lund, and Harald G. Swede, Malmo, Sweden, assignors to AB Tetra PAK, Lund, Sweden, a Swedish company
Filed Aug. 4, 1966, Ser. No. 570,187
Claims priority, application Sweden, Aug. 18, 1965, 10,780/65
Int. Cl. B31b 1/38
U.S. Cl. 93—82           1 Claim

ABSTRACT OF THE DISCLOSURE

A forming ring for guiding and shaping a web-like material into tubular shape which consists basically of a helically wound spring bent into toroidal shape and held in such shape by suitable means.

---

The present invention relates to a forming ring for guiding and forming a web-like material into a tube, preferably for manufacturing packages, by pressing them flat and sealing them transversally.

Forming rings of this kind previously consisted of rigid, massive rings of a certain size for each package size. When changing the package size it proved difficult to change these rings, and in addition they suffered from the disadvantage that there was considerable friction between the inside of the rings and the packaging material.

The present invention provides a forming ring which causes very little friction against the packaging material and which may, if desired, be made adjustable for different tube diameters.

According to the invention this is achieved by means of one or more helically wound springs bent to toroidal shape completely or partly enclosing the material curved to tube shape.

These springs are preferably arranged in such a way as to be threaded onto a core wire serving as the said means, said wire being bent to the desired shape and possibly covered with Teflon or another anti-friction material.

The springs are normally threaded loosely on the core wire, whereby they are caused to rotate on the said wire at the contact with the tube which is fed forward. Alternatively, it is possible to turn the springs by means of suitable driving means so that they will instead contribute to feeding the shaped tube forward.

Further particulars and advantages of the invention will be apparent from the following specification describing two embodiments chosen by way of example and shown in the accompanying drawings, where FIG. 1 shows a device comprising two helically wound springs threaded on a core wire;

FIG. 3 shows a tube shaping unit comprising two devices of the kind shown in FIG. 2;

FIGS. 4 and 5 show two different cross sectional shapes which can be manufactured by means of the device according to the invention.

Figure 1:
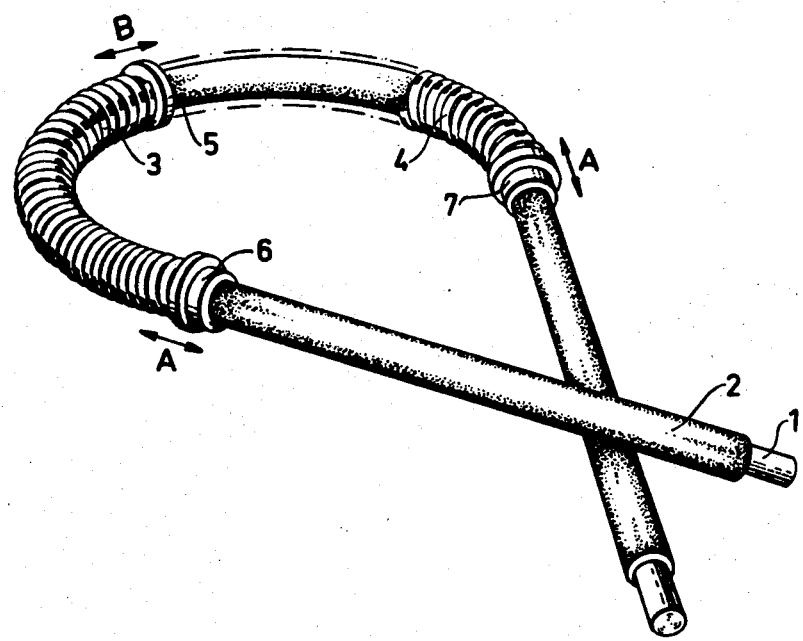

The forming ring shown in FIG. 1 consists of a core wire 1 bent in the shown manner and on which there has been threaded a cover 2 of Teflon or another antifriction material. On this cover there are threaded two helically wound springs 3 and 4, and spring end stopping means 5, 6 and 7 which consist of Teflon or a similar material. The end stopping means 6 and 7 are arranged to be displaced with a close fit along the arrows A. The end stopping means 5 is correspondingly displaceable as indicated by the arrow B. It may be advisable to let the ring 5 run on the cover with a less close fit than for the end stopping means 6 and 7. When the forming ring shown in FIG. 1 is used a web-like material is caused to pass through the interior free space in the forming ring, whereby it is given the desired tube shape as a result of the contact with the inside of the forming ring. In certain cases it may be suitable to dispose the free ends of the core wire 1 clamped in adjusting means not shown displaceable relatively to each other, whereby the diameter of the forming ring may easily be adjusted to different conditions of operation or different tube diameters.

Figure 2:
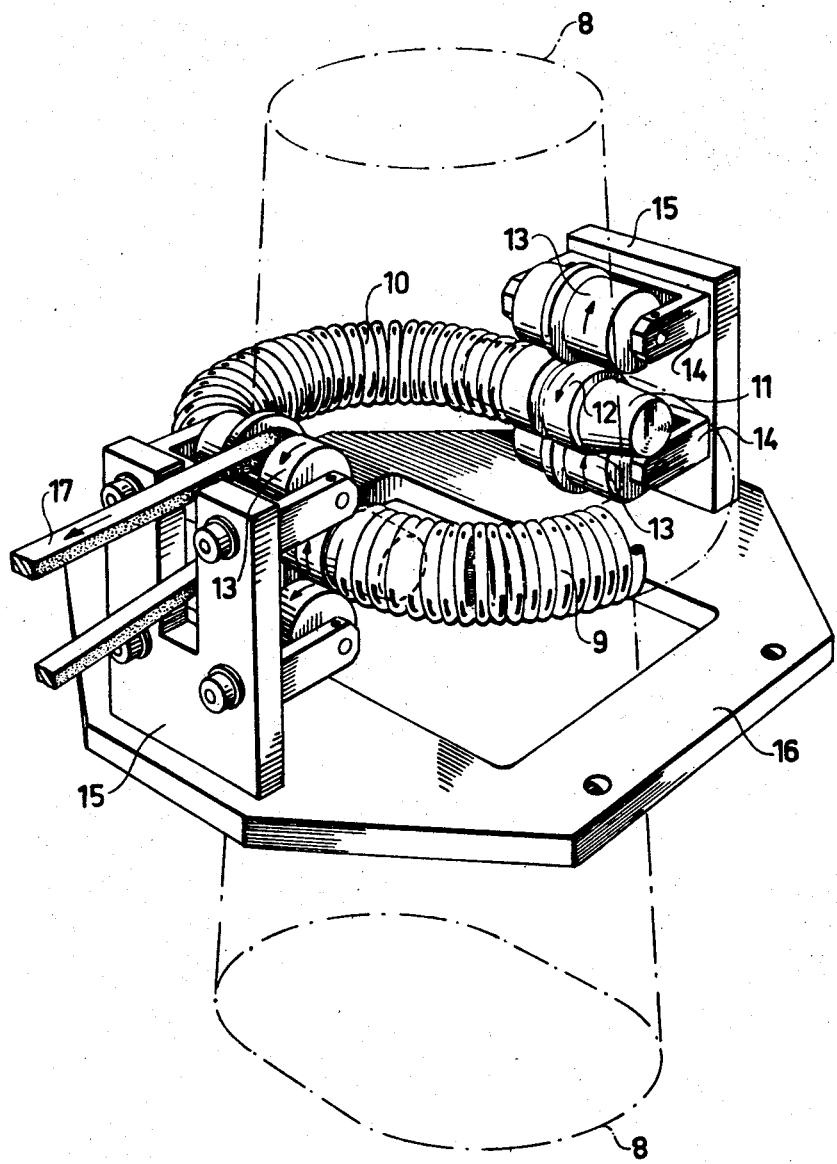
FIG. 2 shows a device comprising two driven helically wound springs.

In the device shown in FIG. 2 a tube is formed by means of two helically wound springs 9 and 10 which are threaded on conical pins 11. These conical pins 11 project from friction rollers 12 which are supported and driven by driving rollers 13. The rollers 13 are journalled on bracket arms 14 which are attached to bearing plates 15. The plates 15 are in turn attached to an attachment plate 16 pertaining to the machine frame. At least one of the driving rollers 13 is driven by means of a V-belt 17 or the like.

In addition to the fact that the helically wound springs 9 and 10 in this embodiment serve to contribute to feeding the tube 8 forwardly, their function essentially coincides with the springs 3 and 4 shown in FIG. 1.

FIG. 3 shows an elevation of a unit comprising two devices of the kind shown in FIG. 2. Consequently, this unit will not have to be described in great detail. The reference numerals coincide with those used in FIG. 2.

FIGS. 4 and 5, finally, show alternative cross sectional shapes of the tube manufactured, i.e. the tube does not have to be entirely circular as shown in FIG. 4 but may have other shapes, as outlined in FIG. 5.

Of course, the invention is not restricted to the embodiments described above but may be varied within the scope of the claims. Thus, the driving of the springs 9 and 10 may be arranged in many different ways, and they may be without driving means, like the springs 3 and 4. Furthermore, the pitch of the different springs may be varied according to what turns out to be suitable for the packaging material in question. Normally, the springs 3 and 4 will be wound more tightly than shown in FIG. 1. Instead of using two forming rings according to the present invention, as shown in FIG. 3, it is possible to combine one forming ring according to the invention with one or more conventional forming rings. The forming rings according to the invention may also be used for guiding a tube already shaped, in which case it contributes at the same time to maintaining the tube shape.

We claim:
1. A forming apparatus for a web of sheet material comprising: a helically wound spring bent to toroidal shape, means in said spring and operably associated therewith to maintain said spring in said shape, said means including a pin member and means contacting and rotating said pin member to rotate said spring.

References Cited

UNITED STATES PATENTS

| | | | |
|---|---|---|---|
| 739,276 | 9/1903 | Allen | 156—589 |
| 2,444,515 | 7/1948 | La Bombard | 93—55.1 |
| 3,223,571 | 12/1965 | Straughan | 53—28 |
| 3,412,656 | 11/1968 | Corneliusson | 93—82 |
| 883,127 | 3/1908 | Bond | 53—347 |
| 2,166,382 | 7/1939 | Temple | 53—358 X |
| 3,383,836 | 5/1968 | Salminen | 53—358 |
| 2,082,167 | 6/1937 | MacCordy. | |
| 2,918,106 | 12/1959 | Fener. | |
| 3,069,303 | 12/1962 | Scholle. | |
| 3,106,630 | 10/1963 | Klamp. | |
| 3,114,301 | 12/1963 | Reifenhauser. | |
| 174,609 | 3/1876 | Wright | 72—465 |
| 2,076,945 | 4/1937 | Hoeflich | 93—94 X |
| 2,398,876 | 4/1946 | Bailey | 93—94 X |
| 2,832,271 | 4/1958 | Jarund | 93—82 |
| 2,981,975 | 5/1961 | Steierman | 93—83 X |
| 3,056,339 | 10/1962 | Sommerfeld | 93—82 |
| 3,296,770 | 1/1967 | Wilson | 93—82 X |

FOREIGN PATENTS

| | | |
|---|---|---|
| 869,557 | 3/1953 | Germany. |

WAYNE A. MORSE, Jr., Primary Examiner

U.S. Cl. X.R.

53—177, 347, 358; 72—465, 468; 93—59; 156—466, 590